United States Patent [19]

Poulin

[11] Patent Number: 5,323,879
[45] Date of Patent: Jun. 28, 1994

[54] ROLLAWAY BRAKE FOR TOOL CARTS

[76] Inventor: Willie F. Poulin, 10647½ Crockett St., Sun Valley, Calif. 91352

[21] Appl. No.: 25,069

[22] Filed: Mar. 2, 1993

[51] Int. Cl.$^5$ .............................. B60T 1/14; B62B 5/04
[52] U.S. Cl. .......................................... 188/19; 188/5
[58] Field of Search ................... 188/5, 6, 7, 19, 23; 280/766.1

[56] References Cited

U.S. PATENT DOCUMENTS

| | | | |
|---|---|---|---|
| 2,132,467 | 10/1938 | Hanson | 188/5 |
| 2,421,328 | 5/1957 | Herold | 188/5 |
| 2,832,438 | 4/1958 | Noyes et al. | 188/5 |
| 2,851,126 | 9/1958 | Ward | 188/5 |
| 3,024,870 | 3/1962 | Kramcsak, Jr. et al. | 188/5 |
| 3,554,328 | 1/1971 | Jones | 188/5 |
| 3,735,841 | 5/1973 | Auriemma | 188/5 |
| 5,035,445 | 7/1991 | Poulin | 280/763.1 |

OTHER PUBLICATIONS

Pp. 93 of RAND Materials Handling Equipment Co., Inc. 1991–1992 catalogue.

*Primary Examiner*—Robert J. Oberleitner
*Assistant Examiner*—Chris Schwartz
*Attorney, Agent, or Firm*—Andrew Jordan

[57] ABSTRACT

A brake for restraining movement of rolling carts. Attachable to heavy tool carts as used in machine and auto shops, a mechanical brake of heavy-duty construction uses a spring-biased bolt to hold a brake pad. The brake pad is of sturdy but resiliently flexible material to engage the floor. To engage the brake, a brake set lever is depressed as by stepping on the lever. The brake set lever is pivotably attached to the brake chassis and has mechanical advantage over the spring-biased bolt. The other end of the brake set lever prevents the longer end from flying up when the brake is released. When the brake is engaged, it is held frictionally in place by the spring-biased brake release lever. The bolt shank passes through the brake release lever. The spring-biasing of the bolt causes the brake release lever to more tightly engage the bolt shank to hold the bolt in place. To release the brake, the spring-biasing of the brake release lever is overcome as by stepping on the lever. The frictional engagement of the bolt shank by the brake release lever is broken and the biasing spring for the bolt moves the bolt upward, taking the brake pad with it. The brake pad is thereby disengaged from the floor.

6 Claims, 1 Drawing Sheet

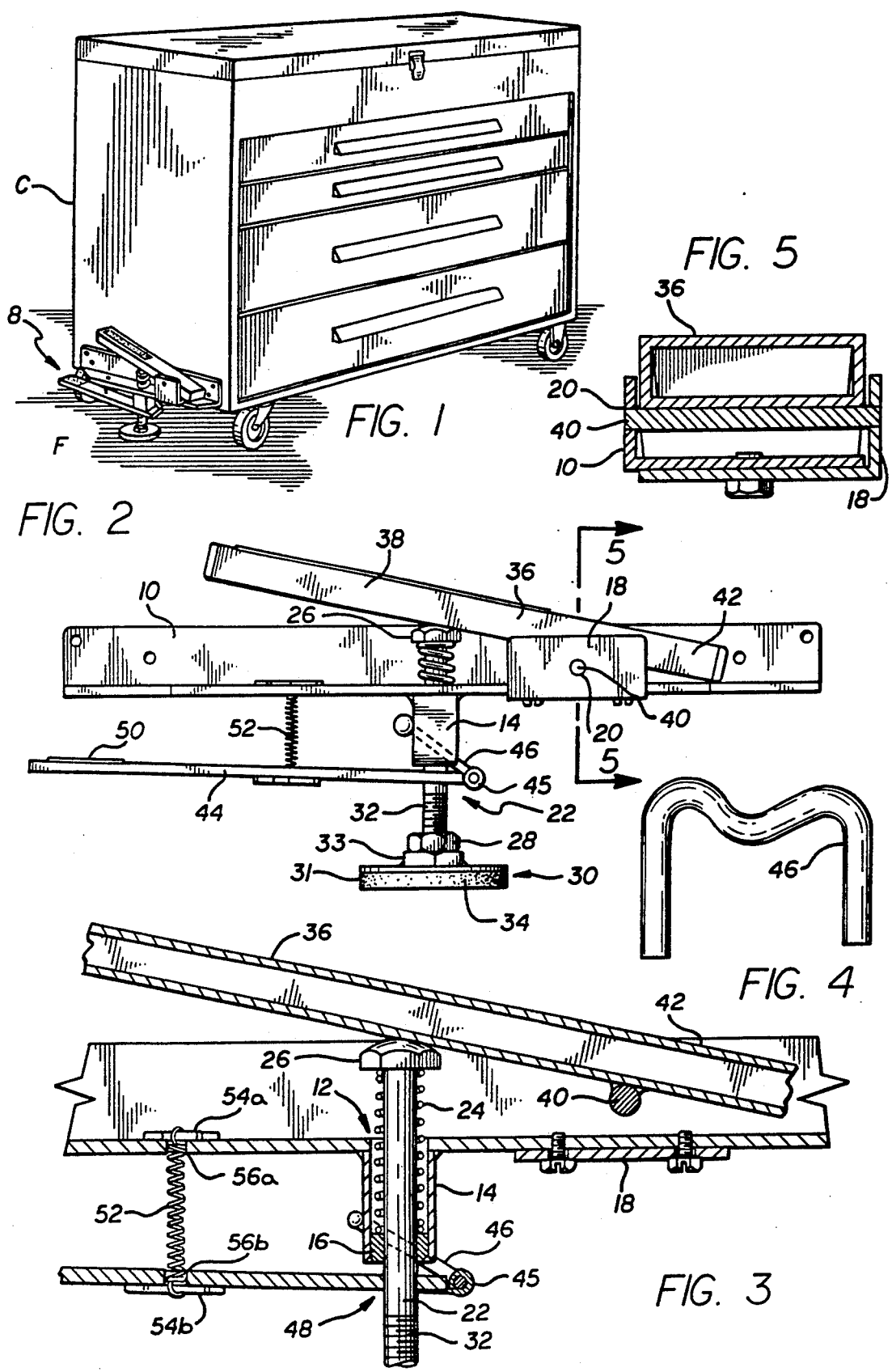

ROLLAWAY BRAKE FOR TOOL CARTS

BACKGROUND OF THE INVENTION

1. Field of the Invention

This invention relates to brakes for rolling tool carts and the like that roll upon swiveling or pivoting wheels, and more especially to brakes for shop tool carts that require or need an external, easily-accessible brake or stopping mechanism.

2. Description of the Related Art

In the past, it has been common practice for machine shops, mechanical service shops, and the like to keep on the premises tool carts that can be rolled upon wheels or casters so that the tools in the tool cart can be conveniently used throughout the shop. These shop tool carts are often very heavy, commonly weighing from 300 to 400 pounds, and often have four wheels or casters, one at each corner of the cart. These carts often have a series of drawers in which the tools are held that are easily accessible, facing and opening out from the long, front side of the rectangular cart.

Commonly, the casters at one end of the cart do not pivot or swivel as they are set parallel to one another and to the long front side of the cart. The casters at the other end of the cart do indeed pivot and swivel so that the direction of the cart may be controlled in a manner that inhibits the cart from escaping from the person pushing or pulling the cart. Allowing only the one pair of casters to swivel allows the rear (when the cart is pushed) or front (when the cart is pulled) end of the cart to be controlled when the cart is moved. The direction of the other, free end of the cart follows the direction of the swivel casters.

In the past, brakes have been used on the swiveling casters to prevent their rolling. By locking the swiveling casters, the cart could neither rotate about the fixed casters nor roll away from its original position. However, brakes on these swiveling casters are not always easily accessible as the caster itself is fixed beneath the cart to bear its weight. The caster may not be visible and the brake or wheel lock not easily accessible. Further, such caster brakes are not always effective and may not serve to restrain the cart.

The inventor of the present invention has previously invented a brake mechanism for carts and dollies, U.S. Pat. No. 5,035,445 issued Jul. 30, 1991, incorporated herein by reference. This brake mechanism also suffered from the drawback that the load upon the dolly or cart could interfere with the brake mechanism itself.

SUMMARY OF THE INVENTION

The present invention is an easily accessible and readily available friction brake for holding shop tool carts and the like in place so that they will not roll or otherwise move in an uncontrolled manner. The chassis of angle iron is connected to the shop tool cart near the floor and provides a chassis for the brake mechanism. Centrally located along the angle iron chassis is a round headed carriage bolt or hex bolt that is spring biased upward through a hole in the chassis. At the lower end of the carriage bolt is the brake foot with the brake pad. The brake foot is secured to the bolt by a jam nut.

Attached to one side of the angle iron chassis is a brake set lever with a brake set lever pin. The brake set lever is pivotably attached to the chassis above the carriage bolt. The brake set lever serves to push down upon the carriage bolt in order to bring the brake pad into contact with the floor beneath the tool cart. The brake set lever is held in place by the set lever pin that is held between the angle iron chassis and an adjusting bracket. When the brake set lever is pressed down by the foot of the mechanic or otherwise, it brings the brake pad into contact with the floor. The carriage bolt is then held in place by a brake release lever through which the carriage bolt passes.

The brake release lever frictionally prevents the carriage bolt from moving back upwards as the upward urging of the carriage bolt by its spring tends to increase the friction between the brake release lever and the carriage bolt. The brake release lever is held in place against the carriage bolt by a release lever spring. The brake release lever releases the carriage bolt when it is pressed downwards by the mechanic's foot or otherwise.

The rollaway cart brake of the present invention allows otherwise free-wheeling tool carts to have placed upon them a safety brake mechanism that prevents free travel of the tool cart when it should remain in one place.

OBJECTS OF THE INVENTION

It is an object the present invention to provide a brake for rollaway tool carts.

It is another object of this invention to provide a brake for rollaway tool carts that is easily attached to existing tool carts or can be integrated for use with tool carts during their construction.

It is another object of this invention to provide a rollaway brake for tool carts that is easily accessible and easy to use.

It is yet another object of the present invention to provide a rollaway brake for tool carts that can be adjusted to operate upon varying sizes of tool carts that may have various heights above the floor.

These and other objects and advantages of the present invention will be apparent from a review of the following specification and accompanying drawings.

BRIEF DESCRIPTION OF THE DRAWINGS

FIG. 1 shows a tool cart with the rollaway brake of the present invention.

FIG. 2 shows an elevation view of the rollaway brake of the present invention.

FIG. 3 shows a cut-away sectional view of the operating portion of the rollaway brake of the present invention.

FIG. 4 shows a plan view of the brake release lever pin used in the rollaway brake of the present invention in FIGS. 2 and 3.

FIG. 5 shows in cross section the bracket securing the brake set lever to the chassis, generally taken along line 5—5 of FIG. 2.

DESCRIPTION OF THE PREFERRED EMBODIMENT

The rollaway brake 8 for tool carts of the present invention has as its foundation a chassis of angle iron 10 that provides the main support for the operating elements of the rollaway brake, as well as the means of attachment to the tool cart C. The chassis 10 is made of 3/16 inch angle iron, metal, or steel. Each angle iron side of the chassis 10 may be 1½ inches wide. The chassis 10 may be eighteen inches long, but may also be a shorter fifteen inches long. The chassis 10 may have two or more apertures through which bolts or other means of attachment can be used to attach the chassis 10, and thereby the rollaway brake 8, to the tool cart C. The angle iron chassis 10 may be angled so as to provide chamfers at its ends. The forward corners of the chassis 10 then do not protrude to present edges which may inflict injury upon others.

At the center of the angle iron chassis 10, an aperture 12 is present that opens into the bolt housing 14. The bolt housing 14 may be made of thinner material than the angle iron chassis 10, such as ⅛ inch or 0.090 inch metal. The bolt housing 14 holds at its end a bushing 16 that is preferably made of a non-binding, low friction material such as nylon or TEFLON. Two nuts may be used that have been reamed to remove their threads. To provide a non-binding, low friction surface, the nuts may be coated with commercially-available ZEP 405 or other TEFLON spray. The bolt housing 14 may be prick-punched to hold the nuts firmly and securely within the bolt housing 14. The bolt housing 14 is approximately two to three inches in length and descends downward from the lower portion of the angle iron chassis 10.

To one side of the bolt housing 14, and affixed as by screws to the angle iron chassis 10, is a bracket 18. The bracket 18 may also be made of ⅛ inch metal and is also made of angle iron that extends from below the lower portion of the angle iron chassis 10 and upward to face opposite the upwardly-facing portion of the angle iron chassis 10. The bracket 18 may be approximately three inches long with angle iron sides of approximately 1½ inches. Centrally located on the upper extending portion of the bracket 18 is a brake set lever pin aperture 20 that corresponds to a brake set lever pin aperture in the angle iron chassis 10. The brake set lever pin apertures 20 in the bracket 18 and the angle iron chassis 10 face opposite one another.

A carriage bolt or hex bolt 22 may be used as a brake shaft in the present invention. If a carriage bolt is used, the square portion of the carriage bolt immediately below the head is preferably removed. The bolt 22 preferably has a round head at its proximal end, a smooth shank, and a threaded distal end. The bolt 22 may be a one-half (½), thirteen (13) bolt. The ½, 13 designation for the bolt indicates that the bolt is one half inch in diameter and that there are 13 threads per inch (a relatively coarse threading). The bolt 22 may be a commonly available, cadmium-plated, 5½ inch bolt. The length of the bolt 22 may be varied to accommodate the demands of the situation for proper and adequate braking.

The bolt 22 fits into the bolt housing 14 and slides through the snug-fitting bushing 16 to extend well past the bottom of the bolt housing 14. A snug or close fit is made between the bolt 22 and the bushing 16 so that there is no play between the two. A main release spring 24 sits between the bushing 16 and the head of the bolt 26. The main release spring 24 serves to urge the head 26 of the bolt upwards.

The other end of the bolt extends well past the lower portion of the bolt housing 14 and is threaded at its farthest end. Threaded upon the threaded end of the bolt 22 is a jam nut 28 and a brake foot 30. The brake foot 30 may be constructed of a circular plate 31 with a centrally located nut 33 on the top side of the plate 31. Both the jam nut 28 and the brake foot 30 thread upon the threaded end 32. Once threaded upon the threaded bolt end 32, the brake foot 30 is locked into place by the jam nut 28. At the lower end of the brake foot, the brake foot plate 31 provides a circular surface approximately 3½ inches in diameter upon which is attached a brake pad 34. The brake pad is made of resilient and flexible material so that it can conform to the floor surface F beneath the brake pad 34 yet can withstand stresses and strains of the forces applied to it by the tool cart C should it be subject to any force or tendency to move. The brake pad 34 is attached to the brake foot 30 by means of an adhesive such as that manufactured by 3M Company, adhesive No. 1357.

Forcing the bolt 22 down in order to set the brake 8 is a brake set lever 36 having a non-skid pad 38 at its long end. The brake set lever 36 is made of 0.060 inch thick tubular steel or other metal. The brake set lever 36 is pivotally attached to the angle iron chassis 10 and the bracket 18 by means of a brake set lever pin 40. The brake set lever pin 40 is approximately 3/8 inch in diameter and fits into the facing set lever pin apertures 20 in the angle iron chassis 10 and the bracket 18. The brake set lever 36 extends past the set lever pin 40 towards the angle iron chassis 10 for approximately three and one-half to four more inches. This extension 42 serves to limit the travel of the brake set lever 36 once the bolt 22 is released.

Attached to the lower portion of the bolt housing 14 is the brake release lever 44. The brake release lever 44 is connected to the bolt housing 14 by means of a hinge loop or knuckle 45 surrounding the free portion of the brake release lever pin 46.

The brake release lever pin 46 is preferably W-shaped and is attached as by welding to the bolt housing 14. One leg of the brake release lever pin 46 is welded to one side of the bolt housing 14. The curved middle portion of the brake release lever pin 46 runs along an adjacent side of the bolt housing 14 and serves to space the other leg out and away from the bolt housing 14. The other leg of the brake release lever pin 46 angles down and away from the bolt housing 14 to provide a shaft or pin at which the brake release lever 44 can pivot to release the bolt 22. The bend at which the other leg of the brake release lever pin 46 begins tends to deform during the bending process which can bind or prevent the pivoting action of the hinge loop 45. The curved middle portion of the brake release lever pin serves to space this deformed portion of the other leg away from brake release lever 44 and its hinge loop 45. If a brake release lever pin 46 may be manufactured that does not deform during the bending or forming process, the "W" shape of the pin 46 may not be required.

The bolt 22 passes through an aperture 48 in the brake release lever 44. The aperture 48 is centrally located on the brake release lever 44, near the release lever pin 46. An edge of the aperture is in frictional contact with the bolt 22 in such a way that the brake release lever 44 "bites" into the bolt 22. As the brake release lever 44 hinges at the brake release lever pin 46, the upward bias of the bolt 22 serves to bring the rake release lever 44 with it. Upward travel of the bolt 22 is thereby prevented by the frictional contact with the brake release lever 44 as the upward bolt 22 movement increases the friction between the bolt 22 and the brake release lever 44. Downward movement of either the bolt 22 or the brake release lever 44 serves to break the frictional contact present between the bolt 22 and the brake release lever 44.

The other end of the brake release lever 44 extends far past the release lever pin 46 and the bolt 22 so as to provide a great deal of leverage when freeing the brake release lever 44 from the bolt 22. A non-skid pad 50 is attached to the upper end of the brake release lever 44 so as to provide a non-skid surface upon which the mechanic's foot may urge the brake release lever 44 downward. The non-skid pad 50 of the brake release lever 44 is located below one of the angle iron chassis 10 chamfers. By locating the brake release lever 44 below a chamfer of the angle iron chassis 10, the brake release lever 44 is easily engaged by the mechanic's foot, but the pressure that can be applied to the brake release lever 44 is limited. Only the toe end of the mechanic's foot can easily engage the brake release lever 44 which is sufficient to release the brake 8. The chamfer allows the limited access to the brake release lever 44 while the remaining lower portion of the angle iron chassis 10 prevents the mechanic from stepping on the release lever with the whole of his weight.

A brake release lever spring 52 is connected between the brake release lever 44 and the lower side of the angle iron chassis 10. The brake release lever spring 52 serves to urge the brake release lever 44 upwards and to hold the brake release lever 44 against the bolt 22. In order to hold the release lever spring in place between the brake release lever 44 and the angle iron chassis 10, pins 54a and 54b may hold the spring as it passes through apertures 56a, 56b in the angle iron chassis 10 and the brake release lever 44.

To set the brake 8 of the present invention, the brake set lever 36 is pressed downwards by the mechanic's foot by stepping on the non-skid pad 38 of the brake set lever 36. By applying the mechanic's foot to the non-skid pad 38 of the brake set lever 36, the brake set lever pivots upon the brake set lever pin 40 and urges the bolt 22 downwards by applying force to the bolt head 26. The force applied by the brake set lever 36 to the bolt 22 is sufficient to overcome the upward bias of the main release spring 24 that urges the bolt 22 upwards and the frictional contact between the bolt 22 and the brake release lever 44. Mechanical advantage by leverage is provided to the brake set lever 36 by the brake set lever pin 40.

When urged downwards through the bolt housing 14, the bolt 22 slides through the bushing 16 and the brake release lever aperture 48. As the bolt 22 moves downward through the bolt housing 14 the brake foot 30 with its pad 34 are brought closer to the floor surface below the tool cart C until ultimately, the pad 34 presses downward upon the floor and pushes slightly upward the rollaway brake 8 of the present invention and the attached tool cart C. The friction between the brake pad 34 and the floor is sufficient to prevent the tool cart C from moving until the rollaway brake 8 is released. When the mechanic's foot is removed from the brake set lever 36, the bolt 22 and brake pad 34 are maintained in their attained position by the brake release lever 44.

Once the brake has been set, the brake may be released by applying downward pressure to the brake release lever 44 such as by stepping upon the non-skid pad 50. The release lever spring 52 urges the brake release lever 44 upwards in order to hold the bolt 22 in place by friction. The brake release lever 44 and its aperture 48 serve to prevent the upward motion of the bolt 16 as urged by the main release spring 24. When the brake release lever is pressed downwards as by stepping, the frictional engagement between the brake release lever 44 and the bolt 16 is broken, allowing the bolt 16 to move freely within the bolt housing 14. When the bolt 16 is allowed to move freely in the housing 14, the main release spring 24 urges the bolt upwards, removing the brake foot 30 with its pad 34 from contact with the floor surface below the rollaway brake 8.

As the main release spring 24 is a spring of substantial force, the movement of the bolt 16 through the brake release lever aperture 48 and the bolt housing 14 may be rapid. As the motion of the bolt upon release may be rapid, the bolt 22 may force the brake set lever 36 upward into the air in a quick fashion. The extension 42 of the brake set lever 36 past set lever pin 40 serves to limit the free pivoting movement of the brake set lever 36 once the bolt has been released. The short extension 42 of the brake set lever 36 past the set lever pin 40 comes into contact with the lower portion of the angle iron chassis 10 when the bolt 16 shoots sufficiently upward to push the brake set lever 36 upward.

When the brake foot 30 with its pad 34 are removed from the floor beneath the rollaway brake 8 and attached tool cart C, free movement of the tool cart C is again available and the cart may be rolled across the shop floor with ease.

While the present invention has been described with regards to particular embodiments, it is recognized that additional variations of the present invention may be devised without departing from the inventive concept.

What I claim is:

1. A brake for a rolling cart, comprising:
   a chassis for sturdily attaching the brake to the cart;
   brake means for frictionally engaging a floor surface below the chassis, the brake means coupled to the chassis, wherein the brake means comprises:
   a bolt housing having a proximal end attached to the chassis and a distal end extending below the chassis, the bolt housing coaxial with a centrally-defined aperture in the chassis;
   a bolt having a proximal end near the chassis and a distal end away from the chassis, the bolt slidably coupled to the chassis and the bolt housing by passing through the chassis aperture and the bolt housing;
   biasing means for upwardly biasing the proximal bolt end away from the bolt housing and the chassis; and
   a brake foot coupled to the distal end of the bolt;
   brake engaging means for bringing the brake means into contact with the floor, wherein said brake engaging means comprises:
   a brake set lever pivotably coupled to the chassis, and engaging the brake means so that the brake means may frictionally engage the floor;
   a bracket connected to the chassis near one end of the chassis and defining a first pin aperture oppositely opposed to a second pin aperture defined by the chassis; and
   a pin connected to the brake set lever so that the brake set lever may pivot about the pin, the pin pivotably fitting within the first and second pin apertures to securely retain the brake set lever wherein the pin is connected near one end of the brake set lever to provide a longer, brake-engaging portion of the brake set lever with mechanical advantage over the bolt, and a shorter portion that restricts the upward motion of the longer, brake-engaging portion of the brake set lever; and brake releasing means for releasing the brake means from the floor.

2. The brake for a rolling cart as set forth in claim 1, wherein the brake releasing means for releasing the brake means from the floor comprises:
   a brake release lever pivotably coupled to the bolt housing, the brake release lever defining a brake release aperture sufficiently large to allow the bolt to freely pass through the brake release aperture and to allow the brake release lever to pivot;
   a brake release lever spring coupling the brake release lever to the chassis and biasing the brake release lever towards the chassis to bring an edge of the brake release aperture into frictional contact with the bolt;
   a brake release lever pin coupling the brake release lever to the bolt housing; whereby
   the bolt is held in place by the brake release lever when biased towards the chassis by the brake release lever spring and whereby the bolt is allowed to slide freely within the bolt housing and through the brake release aperture when the brake release lever is downwardly pivoted to overcome the bias of the brake release lever spring.

3. The brake for a rolling cart as set forth in claim 2, wherein the brake release lever further comprises:
   a hinge loop that surrounds a leg of the brake release lever pin whereby the brake release lever pivots upon the leg of the brake release lever pin.

4. A brake for a rolling cart, comprising:
   a chassis of angle iron for sturdily attaching the brake to the cart, the chassis having a vertical portion and a horizontal portion, and defining a central aperture;
   a bolt housing having a proximal end attached to the chassis and a distal end extending below the chassis, the bolt housing coaxial with the central chassis aperture and having a bushing at the distal end with a surface of low-friction material;
   a bolt having a proximal end near the chassis and a distal end away from the chassis, the bolt slidably coupled to the chassis and the bolt housing by passing through the chassis aperture and the bolt housing, the bolt having a head at its proximal end, a smooth shank passing through the bolt housing and snugly through the bushing, and a threaded distal end;
   a main release spring trapped between the bolt head and the bushing for upwardly biasing the proximal bolt end away from the bolt housing and the chassis;
   a plate connected on an upper side to the threaded distal end of the bolt and having a generally flat lower side;
   a brake pad attached to the lower plate side to provide frictional means for engaging the floor;
   a jam nut coupled to the distal bolt end for securing the plate to the distal bolt end;
   a brake set lever engaging the bolt head so that the brake pad may frictionally engage the floor;
   a bracket connected to the chassis near one end of the chassis and defining a first pin aperture oppositely opposed to a second pin aperture defined by the chassis;
   a pin connected to the brake set lever so that the brake set lever may pivot about the pin, the pin pivotably fitting within the first and second pin apertures to securely retain the brake set lever, the pin connected near one end of the brake set lever to provide a longer, brake-engaging portion of the brake set lever with mechanical advantage over the bolt, and a shorter portion that restricts the upward motion of the longer, brake-engaging portion of the brake set lever;
   a W-shaped brake release lever pin having first and second legs with a middle curved portion, the brake release lever pin angling down and away from the bolt housing and connecting to the bolt housing on one side with the first leg, extending about the bolt housing on an adjacent side with the curved middle portion, and further extending down and away from the bolt housing with the second leg;
   a brake release lever having a hinge loop that surrounds the second leg of the brake release lever pin whereby the brake release lever pivots upon the second leg of the brake release lever pin, the brake release lever defining a brake release aperture sufficiently large to allow the bolt to freely pass through the brake release aperture and to allow the brake release lever to pivot about the brake release lever pin; and
   a brake release lever spring coupling the brake release lever to the chassis and biasing the brake release lever towards the chassis to bring an edge of the brake release aperture into frictional contact with the bolt; whereby
   the bolt is held in place by the brake release lever when biased towards the chassis by the brake release lever spring and whereby the bolt is allowed to side freely within the bolt housing and through the brake release aperture when the brake release lever is downwardly pivoted to overcome the bias of the brake release lever spring.

5. A brake for a rolling cart, comprising:
   a chassis for sturdily attaching the brake to the cart;
   brake means for frictionally engaging a floor surface below the chassis, the brake means coupled to the chassis and comprising:
   a bolt housing having a proximal end attached to the chassis and a distal end extending below the chassis, the bolt housing coaxial with a centrally-defined aperture in the chassis;
   a bolt having a proximal end near the chassis and a distal end away from the chassis, the bolt slidably coupled to the chassis and the bolt housing by passing through the chassis aperture and the bolt housing;
   biasing means for upwardly biasing the proximal bolt end away from the bolt housing and the chassis; and
   a brake foot coupled to the distal end of the bolt;
   brake engaging means for bringing the brake means into contact with the floor; and
   brake releasing means for releasing the brake means from the floor, comprising:
      a brake release lever pivotably coupled to the bolt housing, the brake release lever defining a brake release aperture sufficiently large to allow the bolt to freely pass through the brake release aperture and to allow the brake release lever to pivot;
      a brake release lever spring coupling the brake release lever to the chassis and biasing the brake release lever towards the chassis to bring an edge of the brake release aperture into frictional contact with the bolt;

a W-shaped brake release lever pin coupling the brake release lever to the bolt housing, the brake release lever pin having first and second legs with a middle curved portion, the brake release lever pin angling down and away from the bolt housing and connecting to the bolt housing on one side with the first leg, extending about the bolt housing on an adjacent side with the curved middle portion, and further extending down and away from the bolt housing with the second leg; whereby the bolt is held in place by the brake release lever when biased towards the chassis by the brake release lever spring and whereby the bolt is allowed to slide freely within the bolt housing and through the brake release aperture when the brake release lever is downwardly pivoted to overcome the bias of the brake release lever spring.

6. The brake for a rolling cart as set forth in claim 5, wherein the brake release lever further comprises:

a hinge loop that surrounds the second leg of the brake release lever pin whereby the brake release lever pivots upon the second leg of the brake release lever pin.

* * * * *